US007145701B2

(12) United States Patent  
Haas et al.

(10) Patent No.: US 7,145,701 B2
(45) Date of Patent: Dec. 5, 2006

(54) SCANNER COMPRISING A HOUSING CONFIGURED TO FACILITATE MANUAL REMOVAL OF AN OBJECT FROM THE SCANNER PLATEN

(75) Inventors: William Robert Haas, Fort Collins, CO (US); Kirk Steven Tecu, Greeley, CO (US); Dave Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 10/175,984

(22) Filed: Jun. 19, 2002

(65) Prior Publication Data

US 2003/0234962 A1 Dec. 25, 2003

(51) Int. Cl.
H04N 1/04 (2006.01)
(52) U.S. Cl. ........................ 358/497; 358/474; 358/498; 399/379
(58) Field of Classification Search ................ 358/497, 358/494, 474, 487, 471, 401, 488, 406, 505, 358/506, 501, 504; 399/379, 380, 211, 212; 355/75; 382/312, 318, 319; 250/234–236, 250/239
See application file for complete search history.

(56) References Cited

U.S. PATENT DOCUMENTS

| | | | |
|---|---|---|---|
| 4,917,371 A | 4/1990 | Bastow et al. | 271/245 |
| 4,933,778 A | 6/1990 | Tufano | 358/488 |
| 4,972,235 A | 11/1990 | Iwamoto | 399/370 |
| 5,068,913 A | 11/1991 | Sugiura | 382/175 |
| 5,250,981 A | 10/1993 | Greene | 355/76 |
| 6,011,632 A * | 1/2000 | Chiang | 358/406 |
| 6,026,261 A | 2/2000 | Peng | 399/211 |
| 6,108,108 A | 8/2000 | Peng | 358/497 |

* cited by examiner

Primary Examiner—Cheukfan Lee

(57) ABSTRACT

A scanner comprises a housing including a top wall defining an opening, the top wall of the housing further comprising an upper surface framing the opening. The upper surface of the top wall further comprises a horizontal planar portion and an object removal guide surface between the horizontal planar portion and the opening. A transparent platen supported by the top wall of the housing comprises an upper surface for supporting an object to be scanned, a lower surface parallel with the upper surface of the platen, and a peripheral edge, the horizontal planar portion of the upper surface of the top wall of the housing lying above the upper surface of the platen. The object removal guide surface is (i) positioned relative to the upper, object-supporting planar surface of the platen to permit unobstructed sliding of an object across the peripheral edge of the platen and (ii) configured to raise at least a portion of the object during removal thereof to permit gripping of the raised portion of the object to facilitate removal thereof from the platen.

6 Claims, 3 Drawing Sheets

US 7,145,701 B2

SCANNER COMPRISING A HOUSING CONFIGURED TO FACILITATE MANUAL REMOVAL OF AN OBJECT FROM THE SCANNER PLATEN

BACKGROUND OF THE INVENTION

1. Field of the Invention

The present invention relates generally to optical image scanners and more particularly to facilitating manual removal of an object from a scanner.

2. Description of the Related Art

With reference to FIGS. 1–3, there is shown in schematic form portions of a conventional flatbed scanner 10 comprising a generally rectangular housing 12 extending along a longitudinal direction 14. The housing 12 supports a transparent platen 16 comprising a planar, object-supporting top surface 18 defining the image plane of an object 20 to be scanned. The object 20 may take many forms but will typically comprise a photograph, transparency or a document.

The scanner housing 12 comprises a top wall 22, opposed side walls 24, and front and back walls 26 and 28, respectively. The top wall 22 of the housing comprises an upper surface 30 framing a generally rectangular opening or window 32 formed in the top wall 22. The window 32 is defined by vertical edges such as the edge 34 shown in FIG. 2 channeled to receive and securely retain the perimeter 36 of the platen 16. It will be seen that the representative vertical edge 34 has an upper vertical edge portion 38 extending upwardly from the object-supporting top surface 18 of the platen.

During reflective scanning, the lower surface of the document is illuminated along a transverse linear strip or scan line by a light source on an object-imaging device mounted under the platen for movement from front to back. A beam of light reflected from the illuminated scan line passes through a light-receiving aperture in the object-imaging device to a photodetector array via a system of mirrors. The photodetector array may comprise a linear CCD for converting the image of the object into a digital electronic image.

As shown in FIG. 3, when an attempt is made to remove the document 20 from the scanner by sliding it off the platen across the edge 34 of the window, the upper vertical edge portion 38 intercepts an edge 40 of the document 20 and thus interferes with the removal of the document. To avoid this, the user often needs to pry up an edge of the document with a fingernail so as to raise a margin which can be gripped and the document thereby removed clear of the obstructing window edge. This can be a time-consuming, annoying operation that, in addition, may damage the document.

SUMMARY OF THE INVENTION

In accordance with one, specific exemplary embodiment of the invention, there is provided a scanner comprising a housing comprising a top wall defining an opening, the top wall of the housing further comprising an upper surface framing the opening. The upper surface of the top wall further comprises a horizontal planar portion and an object removal guide surface between the horizontal planar portion and the opening. A transparent platen supported by the top wall of the housing comprises an upper surface for supporting an object to be scanned, a lower surface parallel with the upper surface of the platen, and a peripheral edge, the horizontal planar portion of the upper surface of the top wall of the housing lying above the upper surface of the platen. The object removal guide surface is (i) positioned relative to the upper, object-supporting planar surface of the platen to permit unobstructed sliding of an object across the peripheral edge of the platen and (ii) configured to raise at least a portion of the object during removal thereof to permit gripping of the raised portion of the object to facilitate removal thereof from the platen.

BRIEF DESCRIPTION OF THE DRAWINGS

The foregoing and other objects, features and advantages of the invention will be evident to those skilled in the art from the detailed description, below, taken together with the accompanying drawings, in which.

DETAILED DESCRIPTION

Figure 4:
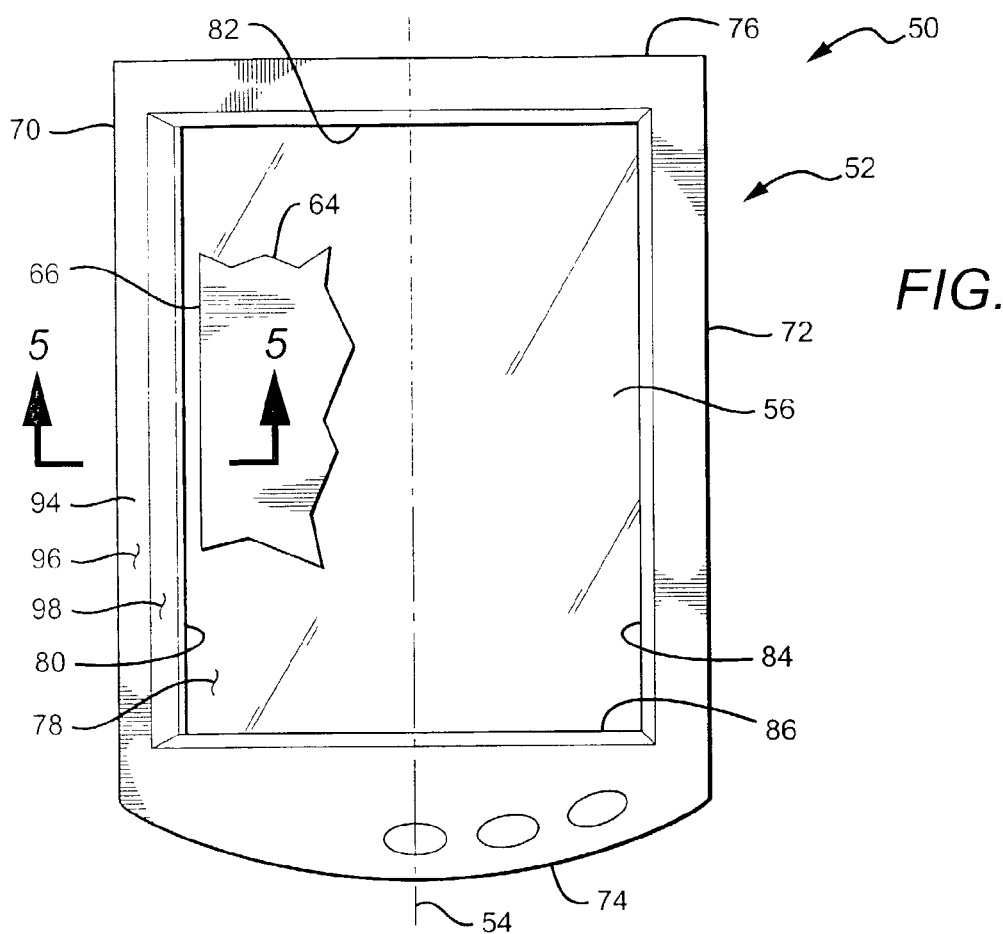
FIG. 4 is a top plan view of a flatbed scanner in accordance with an embodiment of the present invention.
Figure 5:
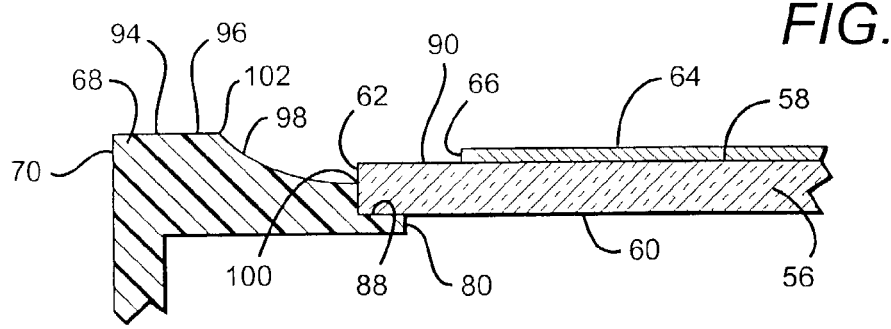
FIG. 5 is an end elevation view, in cross section, of a portion of the flatbed scanner shown in FIG. 4 as seen along the line 5—5 in FIG. 4.

With reference to FIGS. 4 and 5, there is shown in schematic form portions of a flatbed scanner 50 in accordance with a first, preferred embodiment of the present invention. The flatbed scanner 50 comprises a generally rectangular housing 52 extending along a longitudinal direction 54. The housing 52 supports a transparent platen 56 comprising a planar, object-supporting upper surface 58 defining the image plane of an object to be scanned, a lower surface 60 parallel with the upper surface and a peripheral edge 62. As before, the object to be scanned may take many forms; it may comprise a photograph, a document, and so forth. By way of example, the scannable object shown in FIGS. 4 and 5 is a document 64 comprising a paper sheet having a longitudinal edge 66.

For simplicity, the transversely-extending object imaging device adapted to be driven in a longitudinal direction under the platen, the scanner control system, the object imaging device drive, a hinged scanner housing cover and other conventional features are not shown, it being understood that these features are well-known in the art.

The scanner housing 52 comprises a top wall 68, opposed side walls 70 and 72, and front and rear walls 74 and 76. The top wall 68 of the housing has a generally rectangular opening or frame 78 defined by inner edges 80, 82, 84 and 86. As shown in FIG. 5, each edge defines a recess 88 for receiving and retaining the periphery 90 of the platen 56.

In the particular embodiment under consideration, the structure of the top wall 68 along the edges 82, 84 and 86 may be conventional. In accordance with the invention, the portion of the top wall adjoining the window edge 80 comprises an upper surface 94 in turn comprising an outer, horizontal planar surface 96 and an inner object removal guide surface 98. The horizontal planar surface 96 lies in a plane above that of the upper surface 58 of the platen.

Referring now to FIG. 5, pursuant to a first embodiment of the invention the object removal guide surface 98 comprises a concave surface having an inner extremity 100 lying in a horizontal plane between the upper and lower platen surfaces 58 and 60. The concave surface at its outer extremity 102 intercepts the horizontal planar surface 96.

As already explained, in accordance with techniques well-known in the art, during reflective scanning, the lower surface of the document 64 is illuminated along a transverse linear strip or scan line by means of a light source on the object-imaging device movably mounted under the platen. A beam of light reflected from the illuminated scan line passes through a light-receiving aperture in the object-imaging device to a photodetector array via a system of mirrors. The photodetector array may comprise a linear CCD for converting the optical image of the object into a digital, electronic image which may be further process in a computer connected to the scanner.

Figure 6:
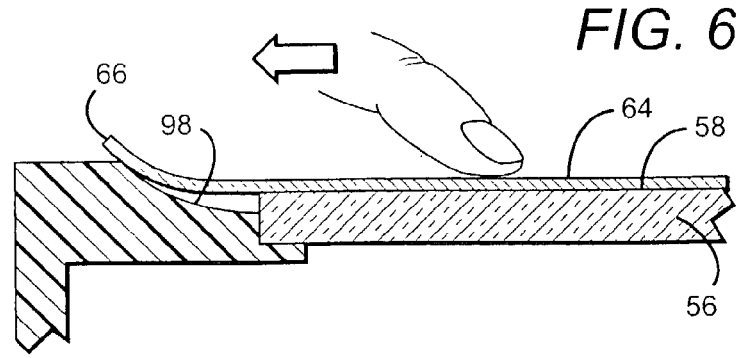
FIG. 6 is the cross sectional end elevation view of FIG. 5 illustrating a document being removed from the flatbed scanner of FIG. 4.

As seen in FIG. 6, following scanning of the document 64, the document may be easily slid, unobstructed, across the edge of the platen. It will be seen from FIG. 6 that the concave margin of the top surface of the housing guides the edge and adjacent margin of the document upwardly and away from the top wall facilitating gripping of the raised margin and removal of the document.

Figure 1:
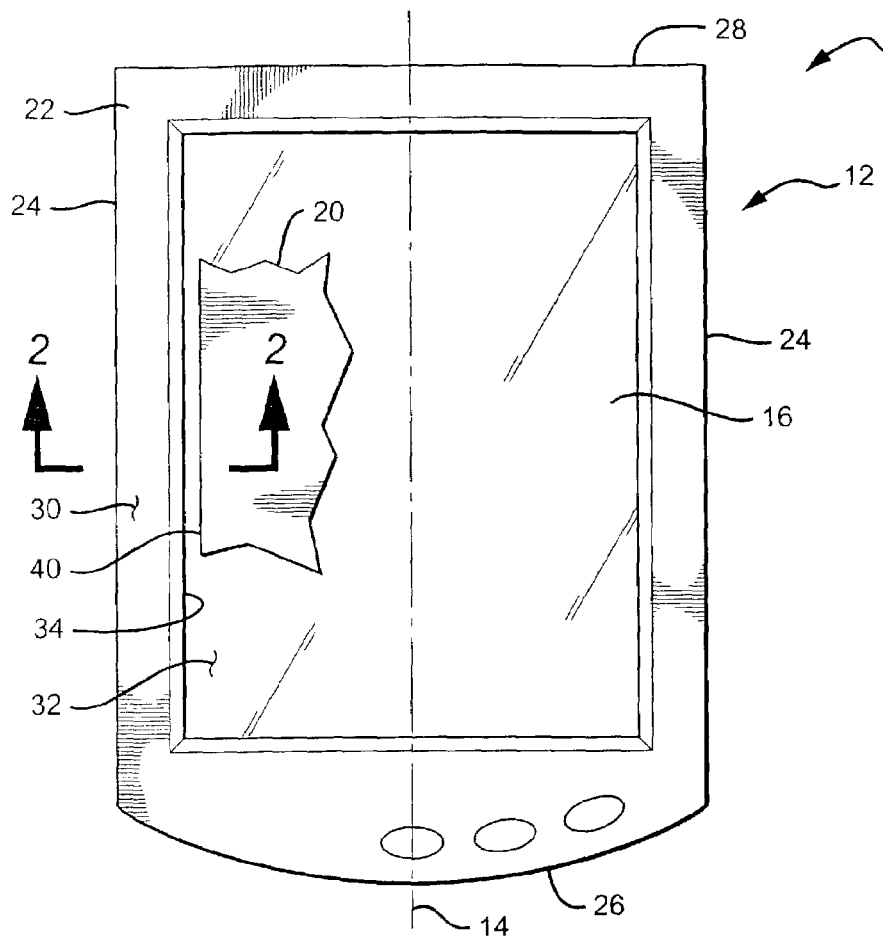
FIG. 1 is a top plan view of a conventional flatbed scanner.
Figure 2:
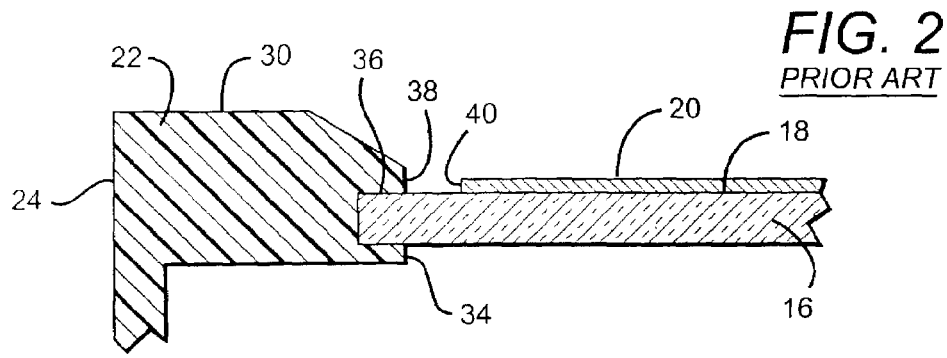
FIG. 2 is an end elevation view, in cross-section, of a portion of the flatbed scanner shown in FIG. 1 as seen along the line 2—2 in FIG. 1.
Figure 3:
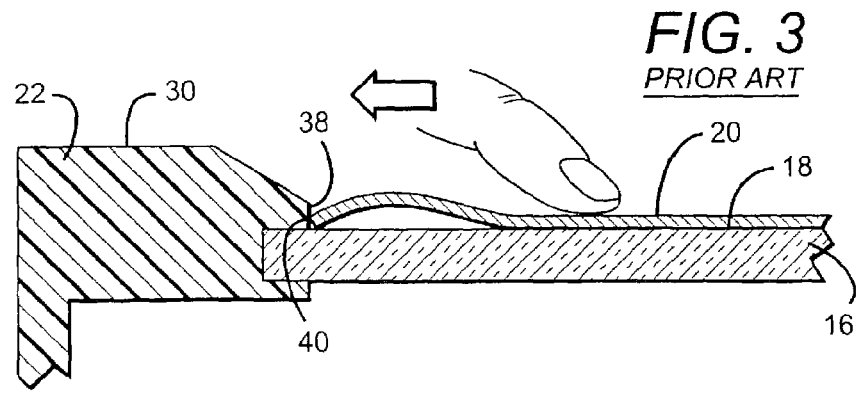
FIG. 3 is the cross section view of FIG. 2 illustrating the difficulty of removing a document from the platen of a conventional scanner.

In the particular embodiment under consideration, the object removal guide surface 98 extends along only one longitudinal edge of the platen; it will be understood however that such a guide surface may be provided along one or more of the other edges of the platen. As mentioned, the remaining margins of the upper surface of the top wall may be conventionally configured as shown, for example, in FIG. 2. Such a conventional edge or edges can assist the user in the proper placement and alignment of the object to be scanned. Where such conventional edges are not provided, appropriate indicia may be provided to aid in the proper placement of an object to be scanned.

Figure 7:
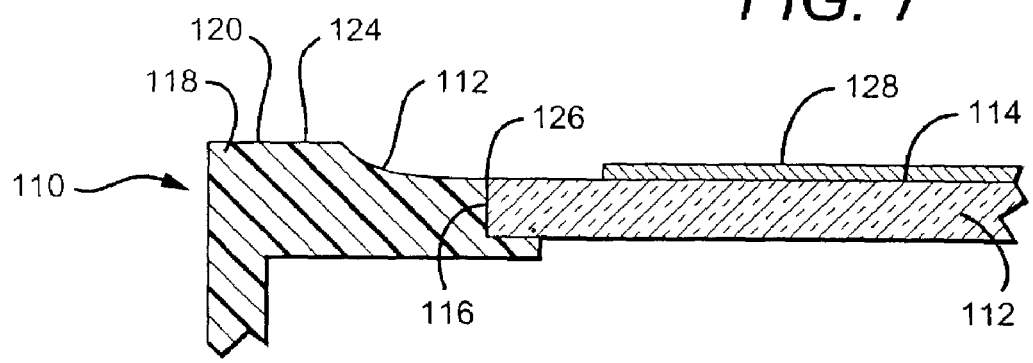
FIG. 7 is an end elevation view, in cross section, similar to that of FIG. 5, of a portion of a flatbed scanner in accordance with another embodiment of the present invention.
Figure 8:
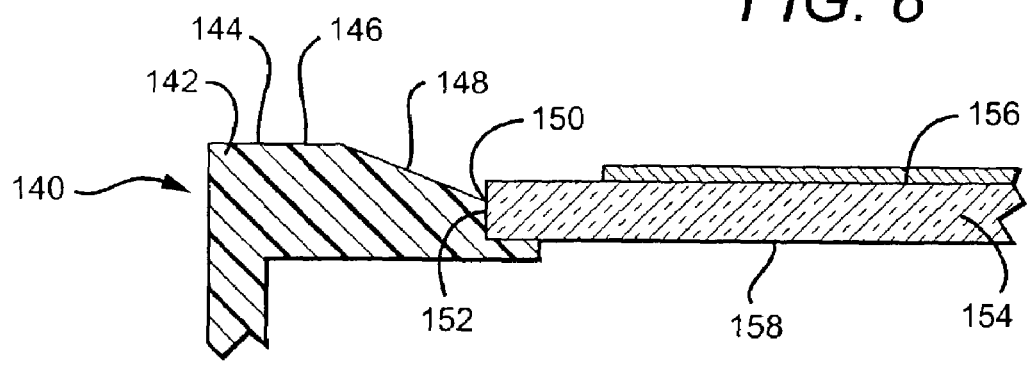
FIG. 8 is an end elevation view, in cross section, similar to that of FIG. 5, of a portion of a flatbed scanner in accordance with a further embodiment of the present invention.

Turning now to FIG. 7, there is shown the relevant portions of a scanner in accordance with another embodiment of the present invention. The scanner of such embodiment is similar to that of the first embodiment, comprising a housing 110 supporting a platen 112 having an object-supporting surface 114 and a peripheral edge 116. The housing 110 comprises a top wall 118 comprising an upper surface 120 including a concave object removal guide surface 122 between the edge of the platen 112 and a horizontal planar surface 124 lying in a plane above that of the object-supporting surface 114 of the platen. In this case, the inner extremity 126 of the scalloped surface 122 lies in the plane of the upper, object-supporting surface 120 of the platen. It will be seen that the embodiment of FIG. 7 also provides for the unobstructed removal of a document 128 from the platen 112. Turning now to FIG. 8, there is shown the relevant portion of a scanner pursuant to a further embodiment of the present invention. This embodiment comprises a housing 140 having a top wall 142 comprising an upper surface 144 comprising an outer horizontal planar surface 146 and an inner object removal guide surface 148. The guide surface 148 has an inner edge 150 abutting the peripheral edge 152 of the platen 154; inner edge 150 lying in a plane between the upper and lower surfaces 156, 158 of the platen. Instead of a concave object removal guide surface, as in the first embodiment discussed, the guide surface 148 of the third embodiment is in the form of a sloped, planar surface extending from the inner edge 150 to the horizontal planar portion of the upper surface 144 which surface 144, as before, is above the upper surface 156 of the platen 154.

Figure 9:
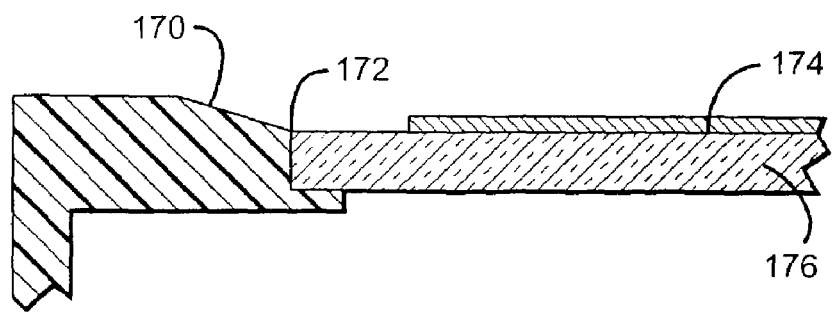
FIG. 9 is an end elevation view, in cross section, similar to that of FIG. 5, of a portion of a flatbed scanner in accordance with a yet another embodiment of the present invention.

Turning now to FIG. 9, there is shown the relevant portion of yet another embodiment of the invention identical in all respects to the embodiment of FIG. 8 in that it comprises a planar, sloping object removal guide surface 170. In the embodiment of FIG. 9 however, the guide surface 170 has an inner edge 172 in the plane of the upper surface 174 of the platen 176. It will be seen that with this embodiment, like the other embodiments of the present invention, the document may be easily removed without obstruction by sliding it toward the object guide surface which will raise the margin of the document allowing it to be easily gripped to effect improved removal of the document.

What is claimed is:

1. A scanner comprising:
a housing comprising a top wall defining an opening, the top wall of the housing further comprising an upper surface framing the opening, the upper surface of the top wall comprising a horizontal planar portion and an object removal guide surface between the horizontal planar portion and the opening;
a transparent platen supported by the top wall of the housing, the platen comprising an upper surface for supporting an object to be scanned, a lower surface parallel with the upper surface of the platen, and a peripheral edge, the horizontal planar portion of the upper surface of the top wall of the housing lying above the upper surface of the platen; and wherein
said guide surface is (i) positioned relative to the upper, object-supporting planar surface of the platen to permit unobstructed sliding of an object across said peripheral edge of the platen and (ii) configured to raise at least a portion of the object during removal thereof to permit gripping of said raised portion of the object to facilitate removal thereof from the platen, the object removal guide surface being a concave surface having an inner edge abutting the peripheral edge of the platen.

2. The scanner of claim 1 in which:
the concave surface blends into the upper object-supporting surface of the platen.

3. The scanner of claim 1 in which:
the inner edge of the concave surface lies in a horizontal plane between the upper and lower surfaces of the platen.

4. A scanner comprising:
a housing comprising a top wall defining an opening, the top wall of the housing further comprising an upper surface framing the opening, the upper surface of the top wall comprising a horizontal planar portion and an object removal guide surface between the horizontal planar portion and the opening;
a transparent platen supported by the top wall of the housing, the platen comprising an upper surface for supporting an object to be scanned, a lower surface parallel with the upper surface of the platen, and a peripheral edge, the horizontal planar portion of the upper surface of the top wall of the housing lying above the upper surface of the platen; and wherein said guide surface is (i) positioned relative to the upper, object-supporting planar surface of the platen to permit unobstructed sliding of an object across said peripheral edge of the platen and (ii) configured to raise at least a portion of the object during removal thereof to permit gripping of said raised portion of the object to facilitate removal thereof from the platen, the object removal guide surface being a planar surface sloping upwardly from the opening to the horizontal planar portion of the upper surface of the top wall of the housing, the planar sloping surface having an inner edge abutting the peripheral edge of the platen.

5. The scanner of claim 4 in which:

the inner edge of the planar sloping surface lies in a horizontal plane between the upper and lower surfaces of the platen.

6. The scanner of claim 4 in which:

the planar sloping surface has an inner edge lying in a plane that is coplanar with the plane of the upper surface of the platen.

* * * * *